US009697247B2

(12) United States Patent
Vijayrao et al.

(10) Patent No.: US 9,697,247 B2
(45) Date of Patent: Jul. 4, 2017

(54) TIERED DATA STORAGE ARCHITECTURE

(71) Applicant: Facebook, Inc., Menlo Park, CA (US)

(72) Inventors: Narsing Vijayrao, Santa Clara, CA (US); Hongzhong Jia, Cupertino, CA (US); Jason Taylor, Berkeley, CA (US); Mark Douglas Callaghan, Bend, OR (US); Domas Mituzas, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 303 days.

(21) Appl. No.: 14/333,391

(22) Filed: Jul. 16, 2014

(65) Prior Publication Data

US 2016/0019254 A1    Jan. 21, 2016

(51) Int. Cl.
*G06F 7/00*    (2006.01)
*G06F 17/30*   (2006.01)

(52) U.S. Cl.
CPC .. *G06F 17/30365* (2013.01); *G06F 17/30598* (2013.01); *G06F 17/30864* (2013.01)

(58) Field of Classification Search
None
See application file for complete search history.

(56) References Cited

U.S. PATENT DOCUMENTS

| | | | | |
|---|---|---|---|---|
| 2004/0148273 A1* | 7/2004 | Allen | ............... | G06F 17/30336 |
| 2008/0235432 A1* | 9/2008 | Chen | .................. | G06F 12/0246 711/100 |
| 2009/0254468 A1* | 10/2009 | Acedo | ................. | G06F 3/0605 705/35 |
| 2010/0299370 A1* | 11/2010 | Otto | ...................... | G01C 21/32 707/803 |
| 2012/0296883 A1* | 11/2012 | Ganesh | ............ | G06F 17/30315 707/693 |
| 2015/0261792 A1* | 9/2015 | Attarde | ............ | G06F 17/30303 707/616 |

* cited by examiner

*Primary Examiner* — Jau-Shya Meng
(74) *Attorney, Agent, or Firm* — Perkins Coie LLP

(57) ABSTRACT

The disclosure is directed to storing data in different tiers of a database based on the access pattern of the data. Immutable data, e.g., data that does not change or changes less often than a specified threshold, is stored in a first storage tier of the database, and mutable data, e.g., data that changes more often than immutable data, is stored in a second storage tier of the database. The second storage tier of the database is more performant than the first storage tier, e.g., the second storage tier has a higher write endurance and a lower write latency than the first storage tier. All writes to the database are performed at the second storage tier and reads on both storage tiers. The storage tiers are synchronized, e.g., the set of data is copied from the second to the first storage tier based on a trigger, e.g., a specified schedule.

18 Claims, 8 Drawing Sheets

TIERED DATA STORAGE ARCHITECTURE

BACKGROUND

Current database management techniques typically design a database as a single tier. The database can include multiple tables for storing different types of data. For example, to store user data of users of an application, a user table can be created to store the user data. Similarly, to store data about a calendar of users, a calendar table may be created. One problem with such techniques is that as the amount of data stored in the database grows, the table size also increases, which can impact the performance of the database, e.g., result in increased consumption of computing resources for performing read/write operations. In order to overcome such situations, some techniques partition a table into multiple tables to store subsets of the data stored in the table and store the partitioned tables on different storage devices. Over time, as the amount of data stored in the database grows, the number of storage devices required to store the data also increases, which results in increased data storage costs.

Some techniques categorize data into hot data, e.g., frequently requested data, and cold data, e.g., data that is not hot data, and store the hot data in a cache, e.g., memory of computing system while storing both the hot data and cold data in persistent storage devices. However, these techniques do not address the problems associated with storing data in persistent storage devices at least because even if the hot data is stored in the memory, it still has to be stored in the persistent storage device of the database and the problem of storing ever growing data still persists. Accordingly, the current techniques for categorizing the data to be stored in memory and the database, and the current single tier database storage architecture do not provide an efficient data storage mechanism.

DETAILED DESCRIPTION

Figure 1:
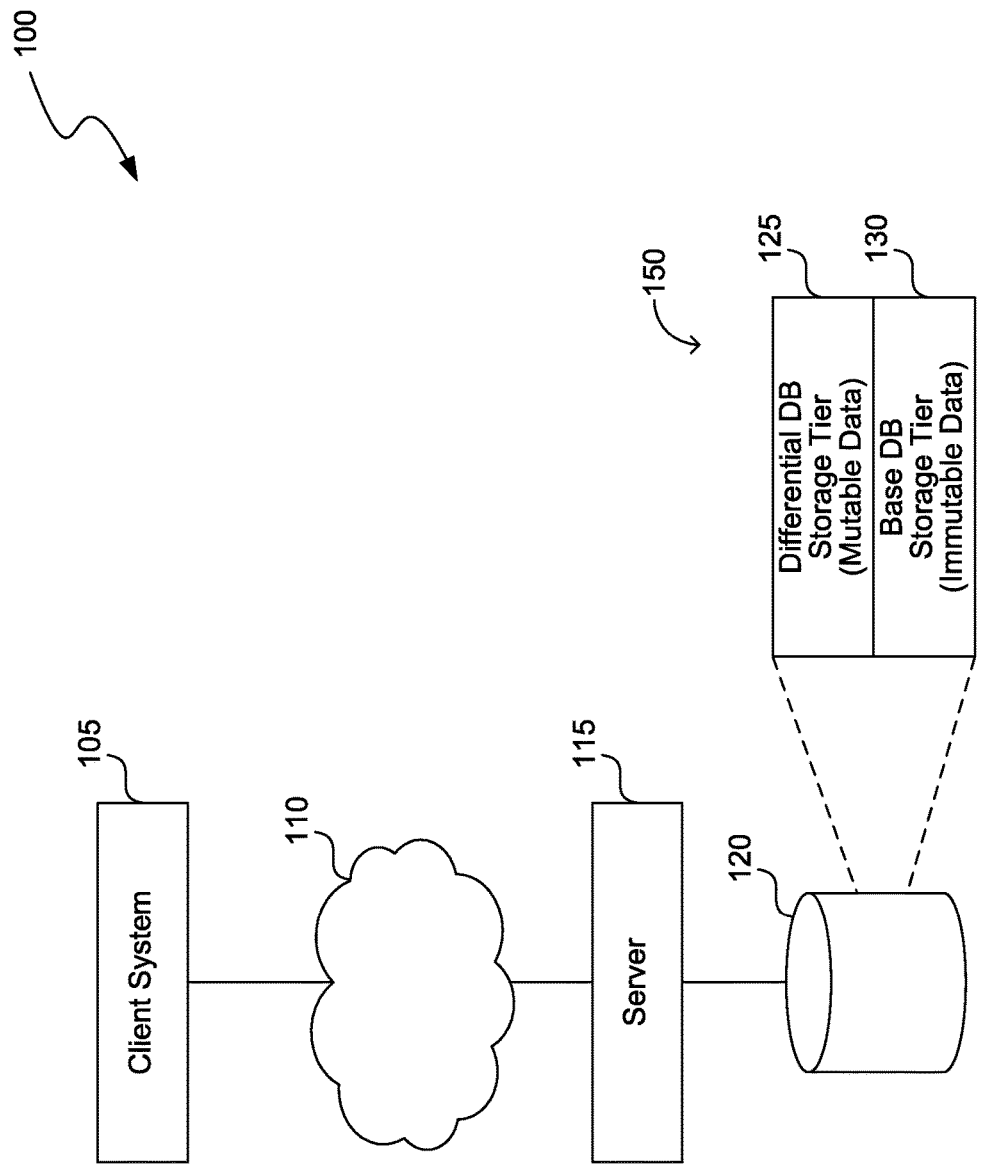
FIG. 1 is a block diagram illustrating an environment in which tiered data storage architecture can be implemented.

The disclosed embodiments are directed to storing data in different tiers of a database based on the access pattern of the data. The embodiments store "immutable" data, e.g., a set of data that does not change or changes less often than a specified threshold, in a first storage tier of the database, and mutable data, e.g., data that changes more often than immutable data, in a second storage tier of the database. Both the storage tiers of the database are made up of persistent storage devices. The second storage tier of the database is more performant than the first storage tier, e.g., the storage devices of the second storage tier have higher write endurance, a lower write latency, better support for read-write operations, or better support for random writes than the storage devices of the first storage tier. In some embodiments, write endurance is defined as the number of program/erase (P/E cycles) that can be applied to a block of flash erase (P/E cycles) before the storage media becomes unreliable. The infrastructure associated with the second storage tier can be more sophisticated than that of the first storage tier. For example, although the first storage tier of the database can include hard drive based storage devices for storing the data, the second storage tier can include flash based storage devices, e.g., multi-level cell (MLC) flash based solid state drives (SSDs). In another example, the first storage tier of the database can include MLC flash based SSDs and the second storage tier can include a single-level cell (SLC) flash based SSDs.

Note that the types of storage devices listed above (e.g., SLC, MLC, SSDs, hard drive, etc.) and throughout the application are examples for illustration purposes. Different storage devices of different types can be used to provide the characteristics of the respective storage tiers described in the application.

In some embodiments, while the second storage tier stores mutable data of an application, the first storage tier can store a complete set of data of the application, that is, both mutable data and immutable data. However, all writes to the set of data stored in the database are stored at the second storage tier. The storage tiers are synchronized, e.g., the set of data is copied from the second storage tier to the first storage tier based on a trigger, e.g., on a specified schedule. Further, when a client system issues a read request, the embodiments query both the storage tiers, obtain the requested set of data from both the storage tiers, merge the set of data based on a merge function and return the combined result to the client.

In some embodiments, the second storage tier can have multiple sub-tiers, which are of varying performance characteristics and costs. Different sub-tiers can be used to store mutable data of varying update frequencies. The mutable data can be categorized into various update frequency levels, e.g., based on a frequency at which the mutable data changes, and data from different update frequency levels can be stored in different sub-tiers. The sub-tiers can have infrastructure at various sophistication levels—starting with the most sophisticated tier to store the mutable data that changes most frequently. For example, the most sophisticated tier can be implemented using fast and expensive dynamic random access memory (DRAM) based SSDs and other less sophisticated sub-tiers can be implemented using less expensive and slower SLC flash based SSDs. The DRAM based SSDs can be used to store mutable data that changes at a "very high" frequency, and the SLC flash based SSDs can be used to store mutable data that changes at frequencies lower than "very high."

While the efficiency of data storage and access increases with the tiered storage architecture, the total cost of ownership associated with the data storage and access decreases, e.g., at least due to having different storage tiers at various sophistication levels.

Environment

FIG. 1 is a block diagram illustrating an environment 100 in which tiered data storage architecture can be implemented. The tiered data storage architecture may be used to store data across various storage layers, e.g., to increase the efficiency of data storage and decrease the total cost of ownership associated with the data storage and access. A server 115 facilitates read/write operations of the client system 105 to a data storage, e.g., database 120. The server 115 can host one or more applications that the client system 105 consumes. For example, the server 115 can host a social networking application that facilitates a number of users to share content between each other. The users may access the social networking application using the client system 105. In some embodiments, the client system 105 can be a third party application that generates data for or consumes data from the social networking application on the server 115. The client system 105 can be a smartphone, a tablet PC, a desktop, a laptop, a server computer, or any other computing device that is capable of generating data for and/or consuming data from the server 115.

The client system 105, the server 115 and the storage system 150 may communicate with each other over communication network 110. The communication network 110 can be any of various types of communication networks, e.g., Internet, local area network (LAN), wide area network (WAN), etc. The client system 105 can perform data access operations on the database 120. The database 120 can be implemented in various configurations. For example, the database 120 can be implemented as a log structure merge tree ("LSM tree") database management system. The LSM tree is a data structure that is employed in applications that require indexed access to data with high throughput. LSM trees typically have an in-memory portion and an on-disk portion. In another example, the database 120 can be implemented as InnoDB database management system of Oracle Corporation of Redwood City, Calif. In some embodiments, InnoDB is a storage engine for MySQL. InnoDB provides the standard ACID (Atomicity, Consistency, Isolation, Durability)-compliant transaction features, along with foreign key support.

The database 120 can be stored across various storage tiers of the storage system 150. In some embodiments, the storage system 150 includes a differential database (DB) storage tier 125 that stores mutable data and a base DB storage tier 130 that stores immutable data. In some embodiments, mutable data is defined as data that changes often, e.g., whose update frequency is more than a predetermined threshold. For example, if a particular data set changes more than 5 times a day, it can be considered as mutable data. A user, e.g., an administrator of the server 115 or the storage system 150, can configure the update frequency threshold for mutable data. Immutable data is defined as data that is not mutable data or data whose update frequency is below the specified threshold. For example, consider generating a meeting request. Certain set of data, e.g., created by, created date and time of the meeting request is constant, e.g., does not change once the meeting request is generated. Such set of data can be considered as immutable data. Other set of data such as meeting time, meeting location, participants may change, and therefore can be mutable data (e.g., depending on how frequently they change).

The differential DB storage tier 125 and the base DB storage tier 130 are made up of persistent storage devices. The differential DB storage tier 125 is more performant than the base DB storage tier 130, e.g., the storage devices of the differential DB storage tier 125 have higher write endurance and lower write latency than the storage devices of the base DB storage tier 130. The infrastructure associated with the differential DB storage tier 125 can be more sophisticated than that of the base DB storage tier 130. In some embodiments, by categorizing the data into mutable data and immutable data and storing them across different storage tiers of varied performance characteristics, the data access and storage efficiency can be improved and the total cost of ownership associated with data storage and access can be reduced.

In some embodiments, the differential DB storage tier 125 can have multiple sub-tiers, which are of varying performance characteristics and costs. Different sub-tiers can be used to store mutable data of varying update frequencies. The mutable data can be categorized into various update frequency levels, e.g., based on a frequency at which the mutable data changes, and data from different update frequency levels can be stored in different sub-tiers. The sub-tiers can have infrastructure at various sophistication levels—starting with the most sophisticated tier to store the mutable data that changes most frequently.

Figure 2:
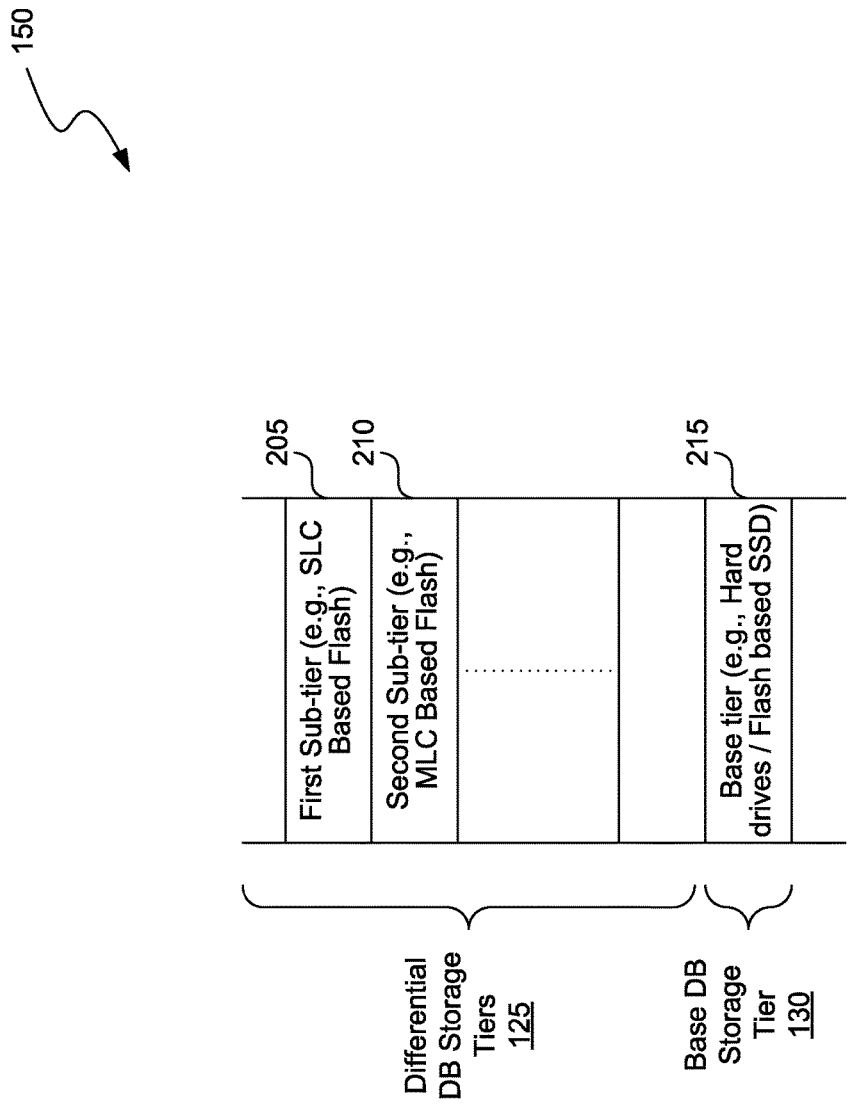
FIG. 2 is a block diagram of an example implementation of the storage system.

FIG. 2 is a block diagram of an example implementation 200 of the storage system 150. The differential DB storage tier 125 can include various types of storage devices that are more performant than the base DB storage tier 130, e.g., the storage devices that have higher write endurance, a lower write latency, better support for read-write operations, or better support for random writes than the storage devices of the base DB storage tier 130. For example, while the base DB storage tier 130 includes hard drive based storage devices, the differential DB storage tier 125 can include flash based storage devices, e.g., multi-level cell (MLC) flash based solid state drives (SSDs) 210.

In some embodiments, the differential DB storage tier 125 can have multiple sub-tiers, e.g., a first sub-tier 205 and a second sub-tier 210. The different sub-tiers can be of varying performance characteristics and costs. The different sub-tiers can be used to store mutable data of varying update frequencies. The mutable data can be categorized into various update frequency levels, e.g., based on a frequency at which the mutable data changes, and data from different update frequency levels can be stored in different sub-tiers. For example, the mutable data that changes most frequently can be stored in the most sophisticated sub-tier, e.g., first sub-tier 205 which includes SLC flash based SSDs that are more performant than MLC flash based SSDs of second sub-tier 210. The SLC flash based SSDs typically have lower write latency and higher write endurance than MLC flash based SSDs. Accordingly, the most frequently changing data can be stored in most sophisticated sub-tier and less frequently changing data can be stored in a sub-tier less sophisticated than the most sophisticated sub-tier. Since more frequently changing data has more write operations, storing the more frequently changing data on storage devices that have a lower write latency and higher write endurance minimizes any delay experienced by the client system 105 in writing the data to the database 120.

In another example, the base DB storage tier 130 of the database can include MLC flash based SSDs and the differential DB storage tier 125 can include SLC flash based SSDs. In yet another example, the base DB storage tier 130 of the database can include MLC flash based SSDs and the differential DB storage tier 125 can include SLC flash based SSDs sub-tier and a DRAM based SSD sub-tier.

Note that the types of storage devices listed above, and throughout the application, are examples for illustration purposes. Other types of storage devices can be used to implement the storage tiers 125 and 130 to provide the described storage and access characteristics of the storage tiers.

Figure 3:
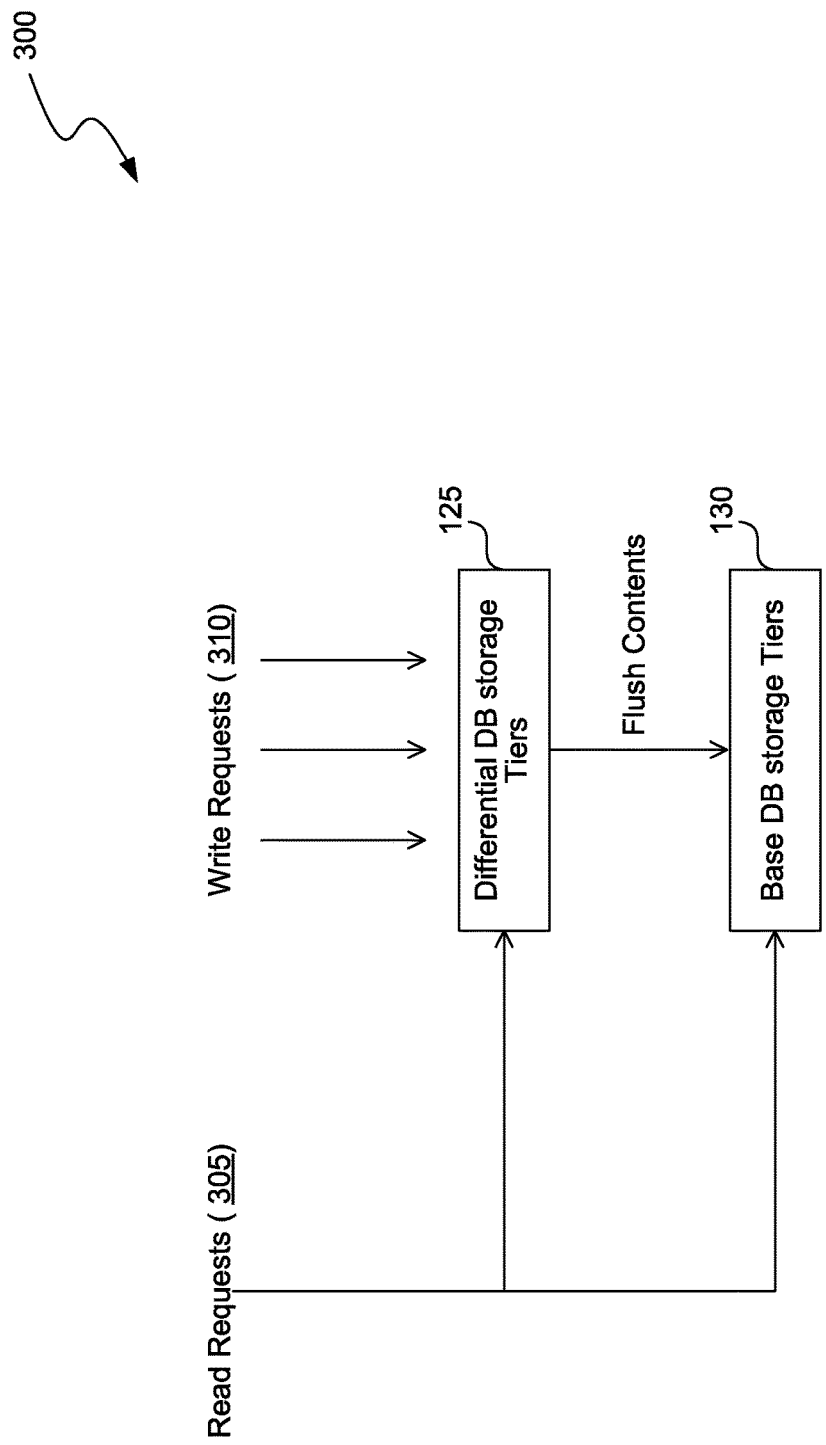
FIG. 3 is a block diagram illustrating processing of data access requests by a storage system of FIG. 1.

FIG. 3 is a block diagram 300 illustrating processing of data access requests by a storage system of FIG. 1. As described above, the differential DB storage tier 125 stores mutable data and the base DB storage tier 130 stores immutable data. In some embodiments, the base DB storage tier 130 stores both immutable and mutable data. The server 115 processes data access requests from the client system 105 for accessing the data items stored at the database 120. The data access request can include a read request 305 to read data items from the database 120 and/or a write request 310 to write new data items or modify existing data items in the database 120.

In some embodiments, the server 115 routes the write request 310 to the differential DB storage tier 125. The write request 310 is processed at the differential DB storage tier 125, that is, the server 115 writes the data items at the differential DB storage tier 125. Since the differential DB storage tier 125 has lesser write latency than the base DB storage tier 130, performing the write operations on the differential DB storage tier 125 consumes lesser time than when data items are written to base DB storage tier 130. The client system 105 experiences little to no delay in completion of the write request 310.

The client system 105 may issue a number of write operations to the database 120. The server 115 executes the write operations from the client system 105 on the differential DB storage tier 125. The server 115 aggregates all the data items written to the differential DB storage tier 125 from a number of write operations and updates the base DB storage tier 130 by writing the aggregated data items to the base DB storage tier 130. The base DB storage tier 130 is updated with the data items written to the differential DB storage tier 125 based on a specified schedule or any other trigger condition. In some embodiments, the trigger condition includes an expiry of a specified period, a number of write operations exceeding a first threshold, an amount of data items written to the differential DB storage tier 125 exceeding a second threshold, available storage capacity at the differential DB storage tier 125 dropping below a third threshold, etc. In some embodiments, a user, e.g., an administrator of the storage system 150 can manually execute a script to flush the data items from the differential DB storage tier 125 to the base DB storage tier 130.

In some embodiments, the trigger condition is configured such that the number of times the base DB storage tier 130 is updated with the data items from the differential DB storage tier 125 is typically lesser than the number of times data items are written to the differential DB storage tier 125. Since the base DB storage tier 130 is less performant, e.g., has higher write latency and lower write endurance than that of the differential DB storage tier 125, and consumes more computing resources than the differential DB storage tier 125 to write the data items, the number of times the base DB storage tier 130 is updated is typically lesser than the number of times data items are written to the differential DB storage tier 125.

Further, the server 115 includes merging logic for merging the data items from the differential DB storage tier 125 to the base DB storage tier 130. For example, if some of the data items written to the differential DB storage tier 125 are new data items that do not exist in the database 120 and some of the data items are updates to existing data items, the merging logic writes the new data items to the base DB storage tier 130 and updates the existing data items with the updates provided by the client system 105. For example, consider a scenario where the base DB storage tier 130 stores a record for a meeting request created by the client system 105 with a meeting date of "Jul. 4, 2014" and a meeting location "The White House." The client system 105 changes the meeting location to "Disneyland" and asks the server 115 to update the database 120. The client system 105 also creates a new meeting request with a meeting date of "Dec. 25, 2014" and a meeting location "The North Pole." The server 115 writes the update to the first meeting request, e.g., "Disneyland" (and other associated data, e.g., an identifier to identify the first meeting request in the database 120) to the differential DB storage tier 125. The server 115 also writes the new meeting request to the differential DB storage tier 125.

When the server 115 flushes the data items from the differential DB storage tier 125 to the base DB storage tier 130, e.g., based on the trigger condition, the merging logic identifies that the new meeting request is a new data item that does not already exist in the database 120 and therefore stores the new meeting request as a new data item. For the first meeting request, the merging logic identifies that the data items is an update to an existing data item and updates the existing record for the first meeting request accordingly.

Since all the write operations from the client system 105 are performed on the differential DB storage tier 125 and merged with base DB storage tier 130 at a later time depending on the trigger condition, in some embodiments, the base DB storage tier 130 may not have the latest data.

Referring back to the data access requests from the client system 105, the data access request can also include a read request 305 from the client system 105 for reading data from the database 120. The server 115 processes the read request 305 by executing the read request 305 on one or all storage tiers of the storage system 150, e.g., the differential DB storage tier 125 and the base DB storage tier 130. In some embodiments, the server 115 executes the read request on all the storage tiers. The server 115 executes the read request 305 on all the storage tiers, obtains the data items from one or more of the storage tiers, merges the data items from the storage tiers to generate the latest data items if necessary, and returns the latest data items to the client system 105.

Continuing with above example of the meeting request where the client system 105 updates the meeting location from "The White House" to "Disneyland," the base DB storage tier 130 may not have the updated meeting location yet if the update is not yet flushed to the base DB storage tier 130 from the differential DB storage tier 125. When the client system 105 issues a read request to obtain the meeting request, the server 115 queries both the differential DB storage tier 125 and the base DB storage tier 130, obtains the change to the meeting location from the differential DB storage tier 125, and obtains the data item associated with the meeting request stored at the base DB storage tier 130. The merging logic compares the timestamp of the change to the meeting location with the timestamp of the data item associated with meeting request, determines if the change has a later timestamp than the timestamp of the meeting request data item obtained from the base DB storage tier 130. If the change has a later timestamp, the merging logic merges the change with the data item associated with the meeting request obtained from the base DB storage tier 130 to generate an updated data item that the corresponds to the updated meeting request. The server 115 then returns the updated data item to the client system 105.

Referring back to processing read requests, in some embodiments, the server 115 can execute the read request on differential DB storage tier 125 but not on the base DB storage tier 130. In some embodiments, a data structure such as bloom filter can be used to speed up look-up operations in a storage system, such as storage system 150. The bloom filter can be cached in a memory, e.g., memory of the server 115, and therefore, if the data items stored in the base DB storage tier 130, e.g., requested data items, is available in the memory, the bloom filter obtains the data items from the memory, thereby avoiding a read operation on the base DB storage tier 130. The server 115 then returns the data items as a function of the data items obtained from the bloom filter and the differential DB storage tier 125.

As can be appreciated, in the tiered storage system 150, any write requests from the client system 105 to write the data to the database 120 are executed on the differential DB storage tier 125. That is, any data to be written to the database 120 is written to the differential DB storage tier 125. Any read requests to read the data from the database 120 are executed on one or both of the differential DB storage tier 125 and the base DB storage tier 130 and data can be returned to the client system 105 as a function of the data retrieved from the differential DB storage tier 125 and the base DB storage tier 130. Further, the data written to the differential DB storage tier 125 over a number of write operations is aggregated and flushed to or merged with the data in the base DB storage tier 130. The flushing of the data to the base DB storage tier 130 can be performed based on a trigger condition.

Figure 4:
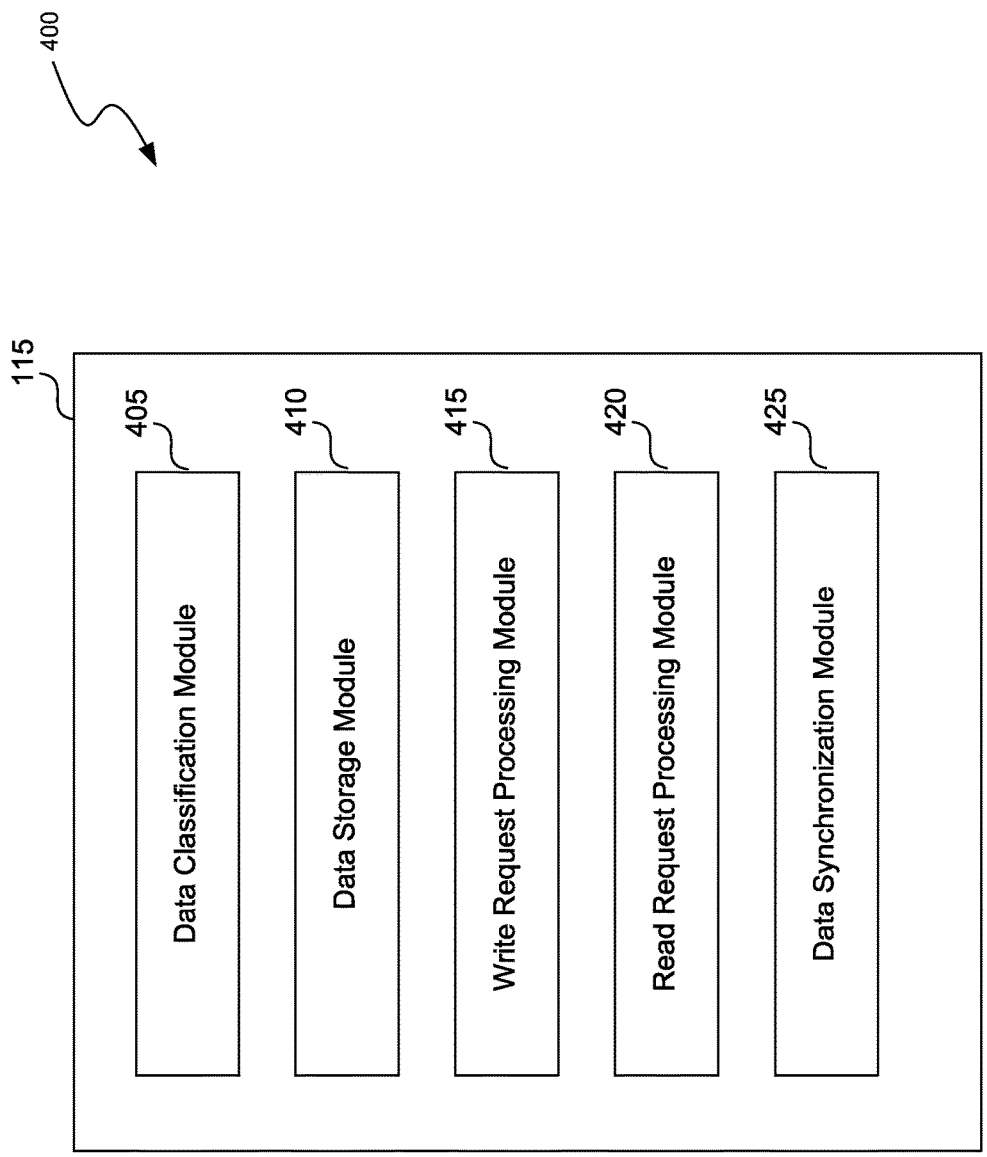
FIG. 4 is a block diagram of a server of FIG. 1.

FIG. 4 is a block diagram of a server of FIG. 1. The server 115 includes a data classification module 405, a data storage module 410, a write request processing module 415, a read request processing module 420 and a data synchronization module 425. The data classification module 405 classifies the data stored in the database 120 to mutable data and immutable data. In some embodiments, mutable data is defined as data whose update frequency is more than a specified threshold. A user, e.g., an administrator of the server 115 or the storage system 150, can configure the update frequency threshold for the mutable data. Immutable data is defined as data that is not mutable data or data whose update frequency is below the specified threshold. In some embodiments, the data classification module 405 monitors the access pattern of the data in the database 120 to determine whether the data is being changed often times. For example, the data classification module 405 can monitor the "last modified date" and/or the "last modified time" attribute of a data item to determine if the data item is being updated frequently.

The database 120 is stored across various storage tiers of a storage system, e.g., the differential DB storage tier 125 and the base DB storage tier 130 of storage system 150. The data storage module 410 stores the mutable data at a storage tier that is more performant than the other storage tiers, e.g., differential DB storage tier 125 of the storage system 150. The data storage module 410 stores the immutable data in storage tiers other than the storage tiers which store mutable data, e.g., in base DB storage tier 130 of the storage system 150. The data storage module 410 obtains information regarding the classification of data from the data classification module 405 and stores the data in the corresponding storage tier of the storage system.

The write request processing module 415 receives write requests from the client system 105 and executes the write requests on the storage tier which is configured to store the mutable data, e.g., differential DB storage tier 125 of the storage system 150. The read request processing module 420 receives read requests from the client system 105, executes the read requests on all the storage tiers of the storage system to obtain the requested and returns the requested data to the client system 105. In returning the requested data, the read request processing module 420 may have to combine data obtained from various storage tiers to generate the requested data, e.g., if updates to a particular data item that is stored at the base DB storage tier 130 is not flushed from the differential DB storage tier 125 to the base DB storage tier 130 yet. In some embodiments, the read request processing module 420 includes merging logic, which aggregates the data obtained from various storage tiers to generate the requested data before the requested data is returned to the client system 105. The merging logic generates the latest data as a function of the data obtained from the various storage tiers.

The data synchronization module 425 updates the base DB storage tier 130 with the data from the differential DB storage tier 125 periodically or based on a trigger condition. The data synchronization module 425 identifies the data items that have been written to the differential DB storage tier 125 since the differential DB storage tier 125 was synchronized last and updates the base DB storage tier 130 with the identified data items. In some embodiments, the data synchronization module 425 combines the data items written to the differential DB storage tier 125 over a number of write operations and writes the combined data items to the base DB storage tier 130 in a single write operation, thereby reducing the number of write operations on the base DB storage tier 130, which has a higher write latency and lower write endurance than the differential DB storage tier 125.

The data synchronization module 425 includes merging logic for merging the data items from the differential DB storage tier 125 to the base DB storage tier 130. For example, if some of the data items written to the differential DB storage tier 125 are new data items that do not exist in the database 120 and some of the data items are updates to existing data items, the merging logic writes the new data items to the base DB storage tier 130 and updates the existing data items with the updates provided by the client system 105. Additional details the foregoing modules of the server 115 are described at least with respect to FIG. 5-7.

Figure 5:
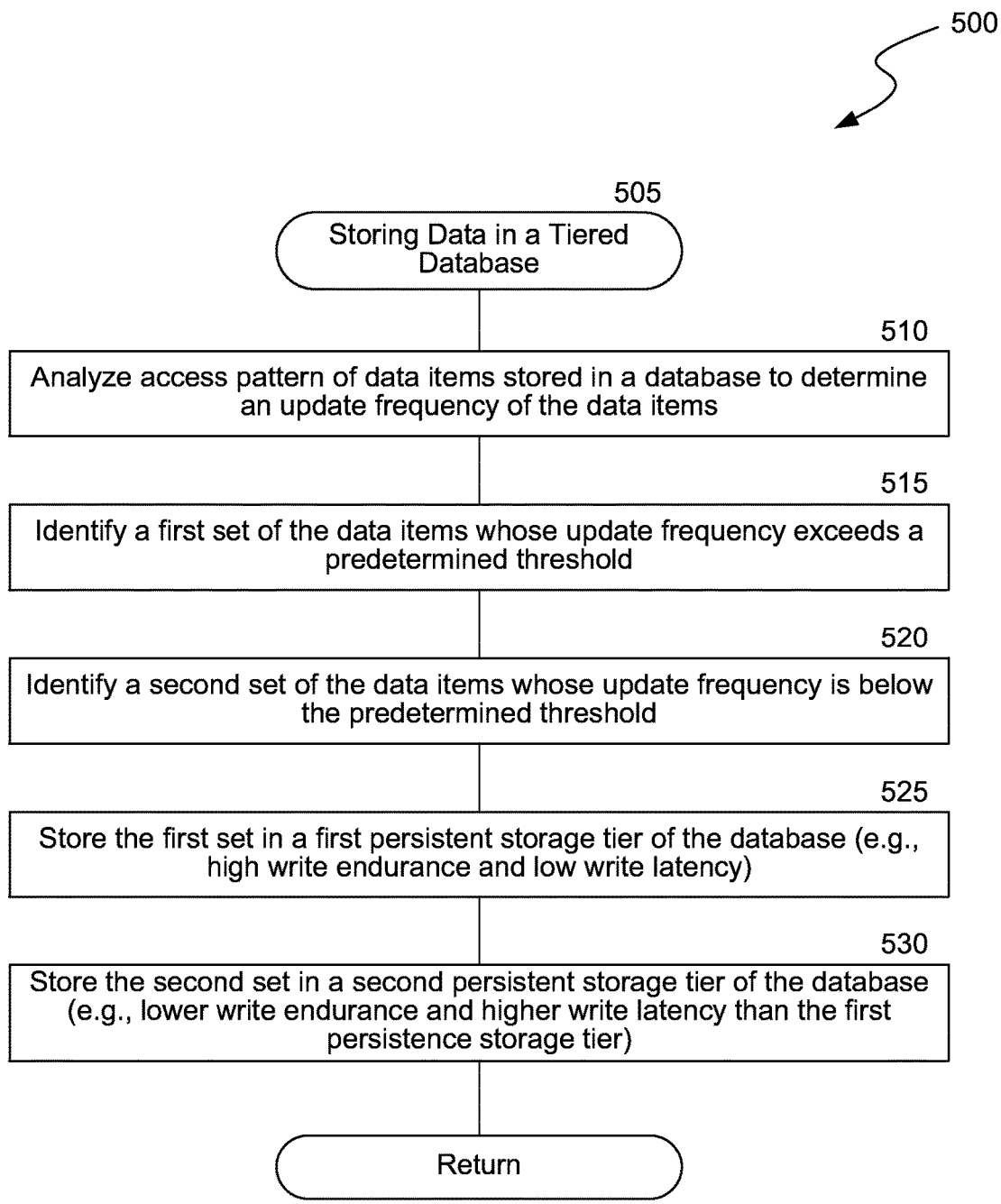
FIG. 5 is a flow diagram of a process for storing data in tiered data storage architecture of environment of FIG. 1.

FIG. 5 is a flow diagram of a process 500 for storing data in tiered data storage architecture of environment 100 of FIG. 1. The process 500 begins at block 505, and at block 510, the data classification module 405 of server 115 analyzes the access pattern of data items stored in a database, e.g., database 120 which is implemented in storage system 150, to determine an update frequency of the data items. For example, the data classification module 405 can analyze the last modified date and/or last modified time of a particular data item over a certain period to determine how often the data item has been updated.

At block 515, the data classification module 405 identifies the data items whose update frequency exceeds a specified threshold as mutable data. The threshold for categorizing the data items as mutable data can be set by a user, e.g., as administrator of the storage system 150. Further, the update frequency can also be categorized into various update frequency levels, e.g., "very-high," "high," "medium" and "low." The administrator can configure the threshold such that data items whose update frequency are or exceeds "high" are considered as mutable data.

At block 520, the data classification module 405 identifies the rest of the data items, e.g., data items not classified as mutable data or whose update frequency is below the specified threshold, as immutable data.

At block 525, the data storage module 410 stores the mutable data in a first persistent storage tier of the database that is most performant among the storage tiers of the tiered storage system, e.g., differential DB storage tier 125, which has the highest write endurance and lowest write latency among the storage tiers.

At block 530, the data storage module 410 stores the immutable data in a second persistent storage layer of the database, e.g., base DB storage tier 130, which has lower write endurance and higher write latency than the first persistence storage tier, and the process 500 returns.

Referring back to storing the mutable data in the first persistent storage tier, in some embodiments, the first persistent storage tier can have multiple sub-tiers and the mutable data can be spread across the multiple sub-tiers of the first storage tier. For differential DB storage tier 125 can have multiple sub-tiers, which are of varying performance characteristics and costs. Different sub-tiers can be used to store mutable data of varying update frequencies. The mutable data from different update frequency levels can be stored in different sub-tiers. The sub-tiers can have infrastructure at various sophistication levels—starting with the most sophisticated tier to store the mutable data that changes most frequently. For example, the most sophisticated tier can be implemented using fast and expensive dynamic random access memory (DRAM) based SSDs and other less sophisticated sub-tiers can be implemented using less expensive and slower SLC flash based SSDs. The DRAM based SSDs can be used to store mutable data that changes at a "very high" frequency, and the SLC flash based SSDs can be used to store mutable data that changes at frequencies lower than "very high."

Figure 6:
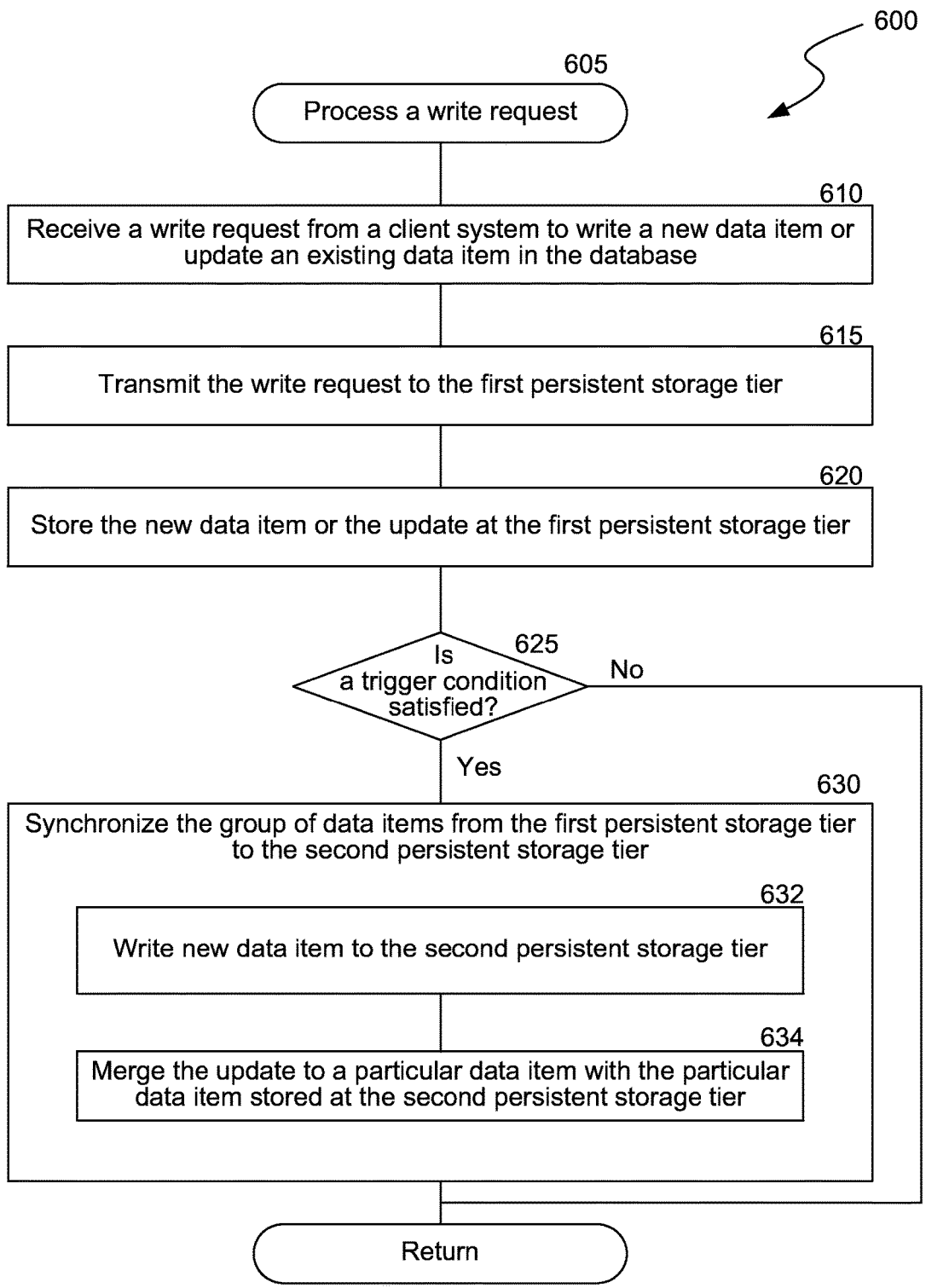
FIG. 6 is a flow diagram of a process for processing a write request in tiered storage architecture of environment of FIG. 1.

FIG. 6 is a flow diagram of a process 600 for processing a write request in tiered storage architecture of environment 100 of FIG. 1. The process 600 begins at block 605, and at block 610, the write request processing module 415 of server 115 receives a write request from a client system to write a new data item or update an existing data item in the database, e.g., database 120 which is implemented in storage system 150. At block 615, the write request processing module 415 executes (or transmits) the write request to the first persistent storage tier, e.g., differential DB storage tier 125 of the storage system 150. At block 620, the write request processing module 415 stores the data received in the write request at the first persistent storage tier. The data received in the write request can include new data items and/or updates to a data item stored in the database.

The write request processing module 415 continues to process such write requests from the client system 105 and stores the data items received in the write requests to the first persistent storage tier.

At determination block 625, the data synchronization module 425 determines whether a trigger condition is satisfied for synchronizing a group of data items from the first persistent storage tier to the second persistent storage tier. If the trigger condition is not satisfied, the process 600 returns. On the other hand, if the trigger condition is satisfied, at block 630, the data synchronization module 425 synchronizes the data from the first persistent storage tier, e.g., differential DB storage tier 125, with the second storage tier, e.g., base DB storage tier 130, and the process 600 returns. In some embodiments, to synchronize the data to the base DB storage tier 130, at block 632, the data synchronization module 425 writes the new data items to the base DB storage tier 130 and at block 634, merges the updates to a particular data item with the particular data item stored at the base DB storage tier 130 to generate an updated data item.

In some embodiments, the data synchronization module 425 includes merging logic for performing steps 632 and 634, e.g., merging the data items from the differential DB storage tier 125 to the base DB storage tier 130.

Figure 7:
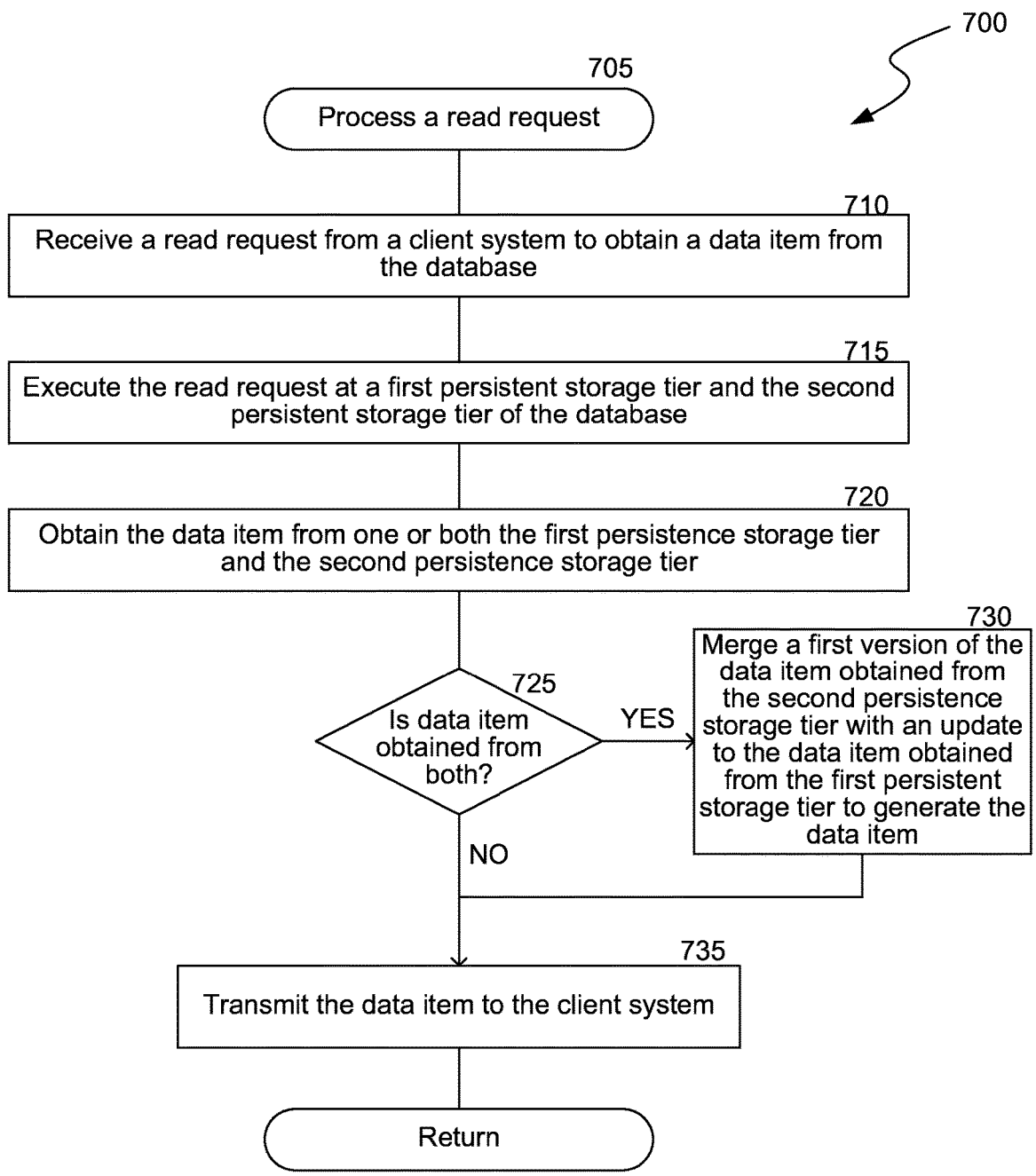
FIG. 7 is a flow diagram of a process for processing a read request in tiered storage architecture of environment of FIG. 1.

FIG. 7 is a flow diagram of a process 700 for processing a read request in tiered storage architecture of environment 100 of FIG. 1. The process 700 begins at block 705, and at block 710, the read request processing module 420 of server 115 receives a read request from a client system to obtain a data item from the database, e.g., database 120. At block 715, the read request processing module 420 executes the read request at both the first persistent storage layer and the second persistent storage layer of the database 120, e.g., differential DB storage tier 125 and base DB storage tier 130 of the storage system 150. In some embodiments, the read request processing module 420 executes the read request on differential DB storage tier 125 and not on the base DB storage tier 130.

At block 720, the read request processing module 420 obtains the data item from one or both of the differential DB storage tier 125 and a source other than the differential DB storage tier 125, e.g., base DB storage tier 130 or a memory of server 115. At determination block 725, the read request processing module 420 determines if the data item is obtained from a source other than the differential DB storage tier 125. Responsive to a determination that the data item is obtained only from one of the storage tiers, at block 735, the read request processing module 420 transmits the requested data item to the client system.

On the other hand, responsive to a determination that the data item is also obtained from source other than the differential DB storage tier 125, e.g., base DB storage tier 130, at block 730, the read request processing module 420 merges a first version of the data item obtained from the base DB storage tier 130 with an update to the data item obtained from the differential DB storage tier 125 to generate the updated data item. As described above, any updates to the data items are written to the differential DB storage tier 125. The read request processing module 420 obtains the data item from the base DB storage tier 130 and the update to the data item from the differential DB storage tier 125 and combines them to generate an updated data items and returns the updated data item to the client system 105 (block 735). In some embodiments, the read request processing module 420 includes merging logic to combine the data item and the update to the data item based on a specified function to generate the updated data item.

Figure 8:
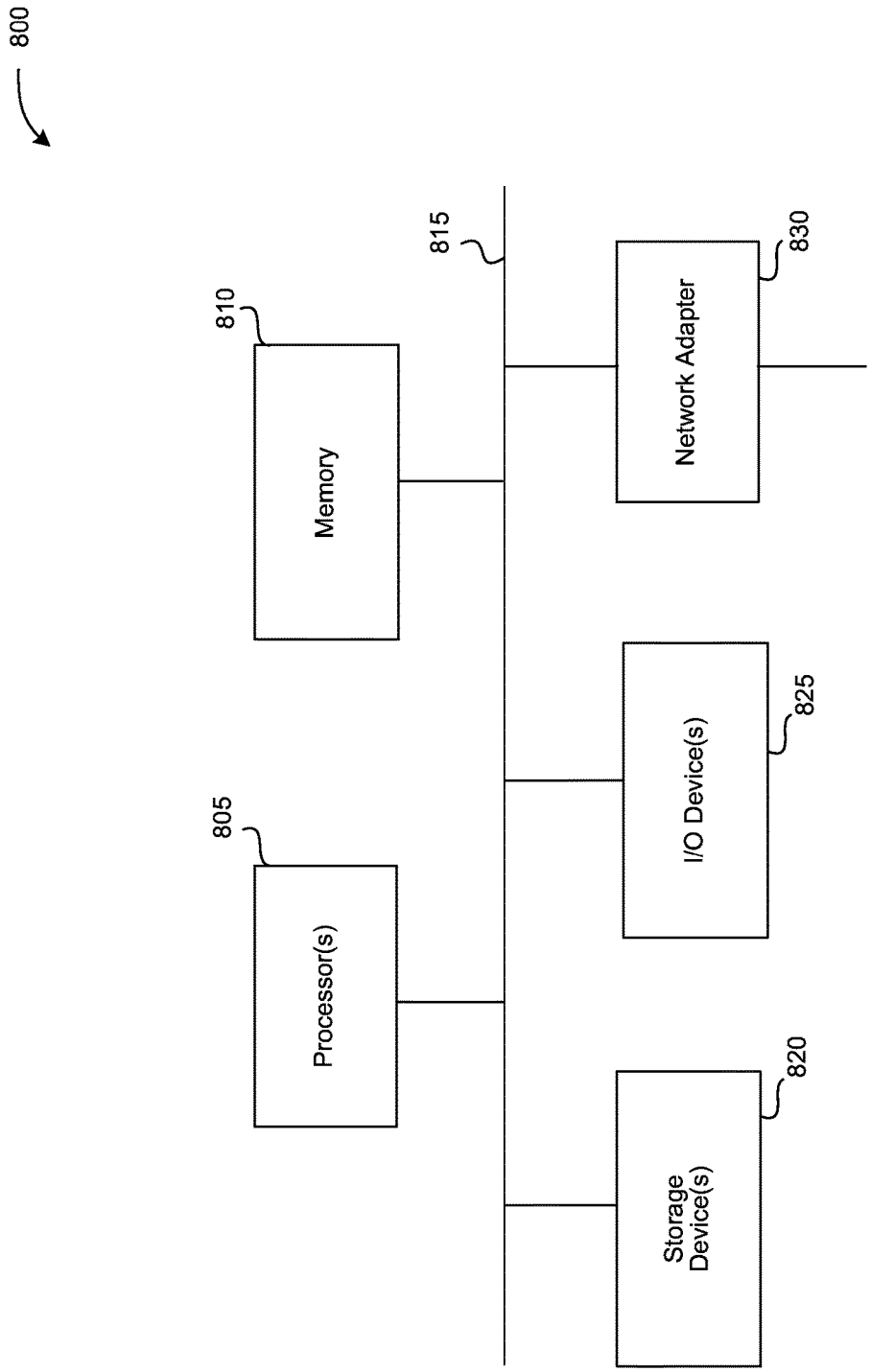
FIG. 8 is a block diagram of a computer system as may be used to implement features of some embodiments.

FIG. 8 is a block diagram of a computer system as may be used to implement features of some embodiments of the disclosed technology. The computing system 800 may be used to implement any of the entities, components or services depicted in the examples of FIGS. 1-7 (and any other components described in this specification). The computing system 800 may include one or more central processing units ("processors") 805, memory 810, input/output devices 825 (e.g., keyboard and pointing devices, display devices), storage devices 820 (e.g., disk drives), and network adapters 830 (e.g., network interfaces) that are connected to an interconnect 815. The interconnect 815 is illustrated as an abstraction that represents any one or more separate physical buses, point to point connections, or both connected by appropriate bridges, adapters, or controllers. The interconnect 815, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 810 and storage devices 820 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 810 can be implemented as software and/or firmware to program the processor(s) 805 to carry out actions described above. In some embodiments, such software or firmware may be initially provided to the processing system 800 by downloading it from a remote system through the computing system 800 (e.g., via network adapter 830).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

REMARKS

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method performed by a computing system, comprising:

identifying a first set of multiple data items in a database whose update frequency exceeds a specified threshold, the update frequency of a data item of the multiple data items being a frequency at which the data item is modified;

identifying a second set of the multiple data items in the database whose update frequency is below the specified threshold;

storing the first set in a first persistent storage layer of multiple persistent storage layers;

storing the second set in a second persistent storage layer of the multiple persistent storage layers, the first persistent storage layer having a higher write endurance and lower write latency than the second persistent storage layer;

receiving a read request to obtain a specified data item from the database; and executing the read request at both the first persistent storage layer and the second persistent storage layer to obtain the specified data item, wherein executing the read request includes:

obtaining the specified data item from the second persistent storage layer, and an update that is to be applied to the specified data item from the first persistent storage layer, merging, based on a merge function, the update with the specified data item to generate an updated specified data item, and returning the updated specified data item as the specified data item.

2. The method of claim 1 further comprising:

receiving a database access request at the computing system;

executing the database access request at the first persistent storage layer in an event the database access request is a write request; and executing the database access request at the first persistent storage layer and the second persistent storage layer in an event the database access request is a read request.

3. The method of claim 1 further comprising:

receiving a write request at the computing system to write a group of data items to the database, the group of data items including at least one of (a) one or more data items not stored at the database or (b) updates to a subset of the multiple data items stored at the database; and storing, in response to the write request, the group of data items at the first persistent storage layer.

4. The method of claim 3 further comprising:
flushing, in response to a trigger condition, the group of data items from the first persistent storage layer to the second persistent storage layer.

5. The method of claim 4, wherein the flushing the group of data items to the second persistent storage layer includes at least one of:
writing the one or more data items at the second persistent storage layer, or
merging the updates with the corresponding subset of the multiple data items stored at the second persistent storage layer.

6. The method of claim 1 further comprising:
transmitting the specified data item in response to the read request.

7. The method of claim 1, wherein the read request is executed at the first persistent storage layer and the second persistent storage layer in parallel.

8. The method of claim 1, wherein identifying the first set of the multiple data items and the second set of the multiple data items includes analyzing an access pattern of the multiple data items stored at the database to determine an update frequency of each of the multiple data items.

9. The method of claim 1, wherein the first persistent storage layer includes a first set of storage devices and the second persistent storage layer includes a second set of storage devices, the first set of storage devices having at least one of a write latency lesser than that of the second set of storage devices or a higher write endurance than that of the second set of storage devices.

10. The method of claim 1, wherein identifying the first set of the multiple data items whose update frequency exceeds the specified threshold includes:
determining multiple update frequency levels, wherein each of the update frequency levels exceeds the specified threshold, and
assigning each of the first set of the multiple data items to an update frequency level of the update frequency levels based on the update frequency of the corresponding data item.

11. The method of claim 10, wherein the first persistent storage layer is further categorized into multiple sub-layers, each of the sub-layers corresponding to one of the update frequency levels.

12. The method of claim 11, wherein the sub-layers include a first sub-layer corresponding to a highest update frequency levels of the update frequency levels, and wherein the sub-layers include a last sub-layer corresponding to a lowest update frequency levels of the update frequency levels.

13. The method of claim 12, wherein the first sub-layer includes a first set of storage devices and the last sub-layer includes a second set of storage devices, the first set of storage devices having a write latency lesser than that of the second set of storage devices.

14. A non-transitory computer-readable storage medium storing computer-executable instructions, which, when executed by a computer, performs a method comprising:
analyzing an access pattern of multiple data items stored at a database to determine an update frequency of each of the multiple data items, the update frequency of a data item of the multiple data items being a frequency at which the data item is modified;
assigning each of the multiple data items to one of multiple update frequency levels based on the update frequency of the corresponding data item;
assigning a first set of the update frequency levels to a first persistent storage layer of multiple persistent storage layers, the assigning including:
storing a first set of the multiple data items whose update frequency is within the first set of the update frequency levels at the first persistent storage layer;
assigning a second set of the update frequency levels to a second persistent storage layer of the multiple persistent storage layers, the assigning including:
storing a second set of the multiple data items whose update frequency is within the second set of the update frequency levels at the second persistent storage layer, the first persistent storage layer having a lower write latency than the second persistent storage layer;
receiving a read request to obtain a specified data item from the database; and
executing the read request at both the first persistent storage layer and the second persistent storage layer to obtain the specified data item, wherein executing the read request includes:
obtaining the specified data item from the second persistent storage layer, and an update that is to be applied to the specified data item from the first persistent storage layer,
merging, based on a merge function, the update with the specified data item to generate an updated specified data item, and
returning the updated specified data item as the specified data item.

15. The computer-readable storage medium of claim 14, wherein the first set of the update frequency levels represent an update frequency that exceeds the second set of the update frequency levels.

16. The computer-readable storage medium of claim 14, wherein the first persistent storage layer is further categorized into multiple sub-layers, each of the sub-layers corresponding to one or more of the first set of the update frequency levels and stores a subset of the first set of the multiple data items corresponding to the one or more of the first set of the update frequency levels.

17. A system, comprising:
a processor;
a memory;
a data classification module configured to determine a first set of multiple data items whose update frequency exceeds a specified threshold and a second set of the multiple data items whose update frequency is below the specified threshold, the multiple data items stored in a database of the system, the database stored across multiple persistent storage layers of the system, the update frequency of a data item of the multiple data items being a frequency at which the data item is modified;
a data storage module configured to store the first set of the multiple data items at a first persistent storage layer of the multiple persistent storage layers and the second set of the multiple data items at a second persistent storage layer of the multiple persistent storage layers, the first persistent storage layer having a higher write endurance and a lower write latency than the second persistent storage layer;

a write request processing module configured to route a write request from a client system to the first persistent storage layer, the write request including a set of data items or updates to any of the multiple data items stored in the database;

a data synchronization module configured to synchronize the set of data items or the updates to any of the multiple data items at the first persistent storage layer with the second persistent storage layer; and a read request processing module configured to route a read request for obtaining a specified data item to the first persistent storage layer and the second persistent storage layer, wherein the read request processing module obtains the specified data item by:

obtaining the specified data item from the second persistent storage layer, and an update that is to be applied to the specified data item from the first persistent storage layer, merging, based on a merge function, the update with the specified data item to generate an updated specified data item, and returning the updated specified data item as the specified data item.

18. The system of claim 17, wherein the read request processing module is further configured to obtain the specified data item as a combination of a first version of the first data item stored at the second persistent storage layer and a second version of the first data item stored at the first persistent storage layer.

* * * * *